United States Patent [19]
Shintani

[11] Patent Number: 6,055,216
[45] Date of Patent: *Apr. 25, 2000

[54] OPTICAL DISK PLAYER CAPABLE OF PLAYING BACK BOTH CD-ROM AND CD-DA

[75] Inventor: Fumihiko Shintani, Yokohama, Japan

[73] Assignee: Kabushiki Kaisha Toshiba, Kawasaki, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/909,872

[22] Filed: Aug. 12, 1997

[30] Foreign Application Priority Data

Aug. 15, 1996 [JP] Japan .................................. 8-232642

[51] Int. Cl.[7] ................................................ G11B 17/22
[52] U.S. Cl. .............................................. 369/32; 369/33
[58] Field of Search ............................ 369/32, 33, 48, 369/47, 54; 386/125, 126

[56] References Cited

U.S. PATENT DOCUMENTS 5,214,631  5/1993  Maeda et al. ............................. 369/59
5,363,362  11/1994 Maeda et al. ............................. 369/54
5,420,839  5/1995  Tateishi ..................................... 369/32
5,870,355  2/1999  Fujihara .................................... 369/32

FOREIGN PATENT DOCUMENTS 6-96529  4/1994  Japan .

*Primary Examiner*—Tan Dinh
*Attorney, Agent, or Firm*—Oblon, Spivak, McClelland, Maier & Neustadt, P.C.

[57] ABSTRACT

The present invention provides a disk reproduction apparatus including a CD player and a CD-ROM decoder which reproduces PCM data at a high rate uncorrelated with an audio reproduction rate thereby to narrow a range necessary for operating the apparatus. The CD player reads information data including audio data from a disk as reproduction data and control data and demodulates the information data. The disk reproduction apparatus also includes a decoder for decoding the demodulated data, a buffer memory controlled by the decoder, a write means for writing the demodulated data to the buffer memory, and a readout means for reading the reproduction data and control data out of the buffer memory. Since the buffer memory has a relatively large capacity, a write/read operation for the audio data can be performed easily and sufficiently.

8 Claims, 12 Drawing Sheets

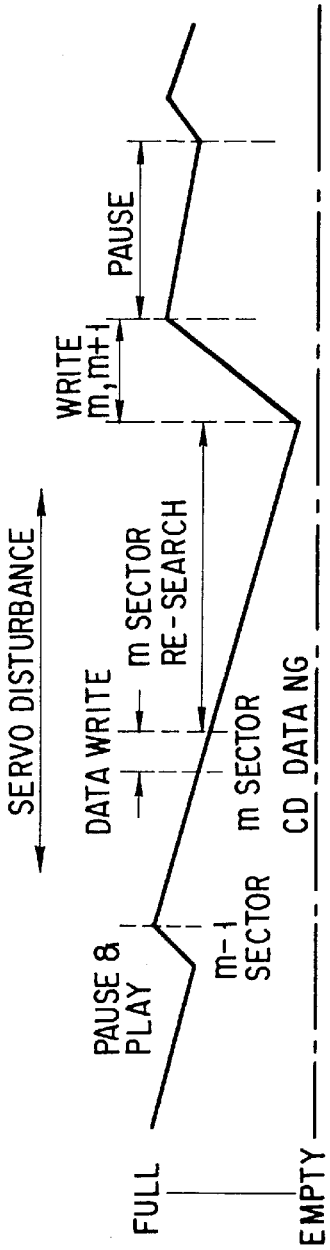
F I G. 5
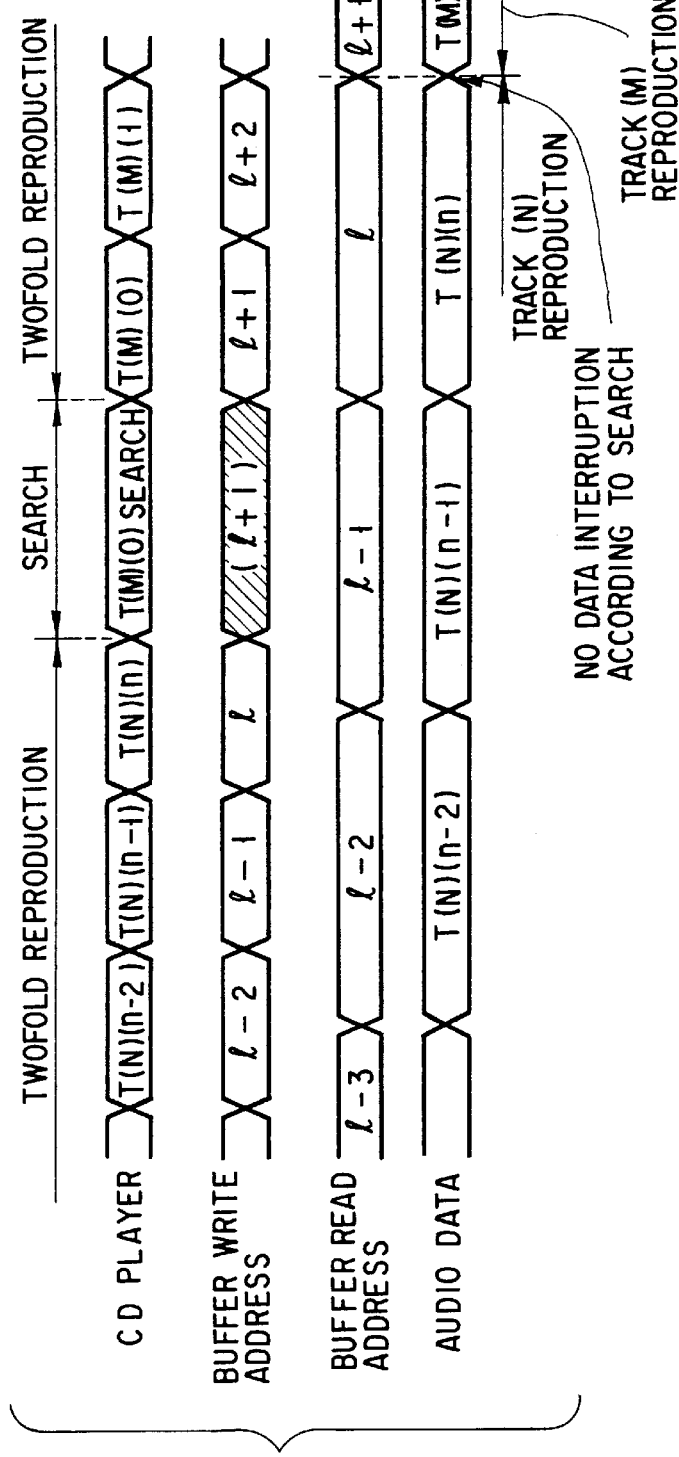
F I G. 6

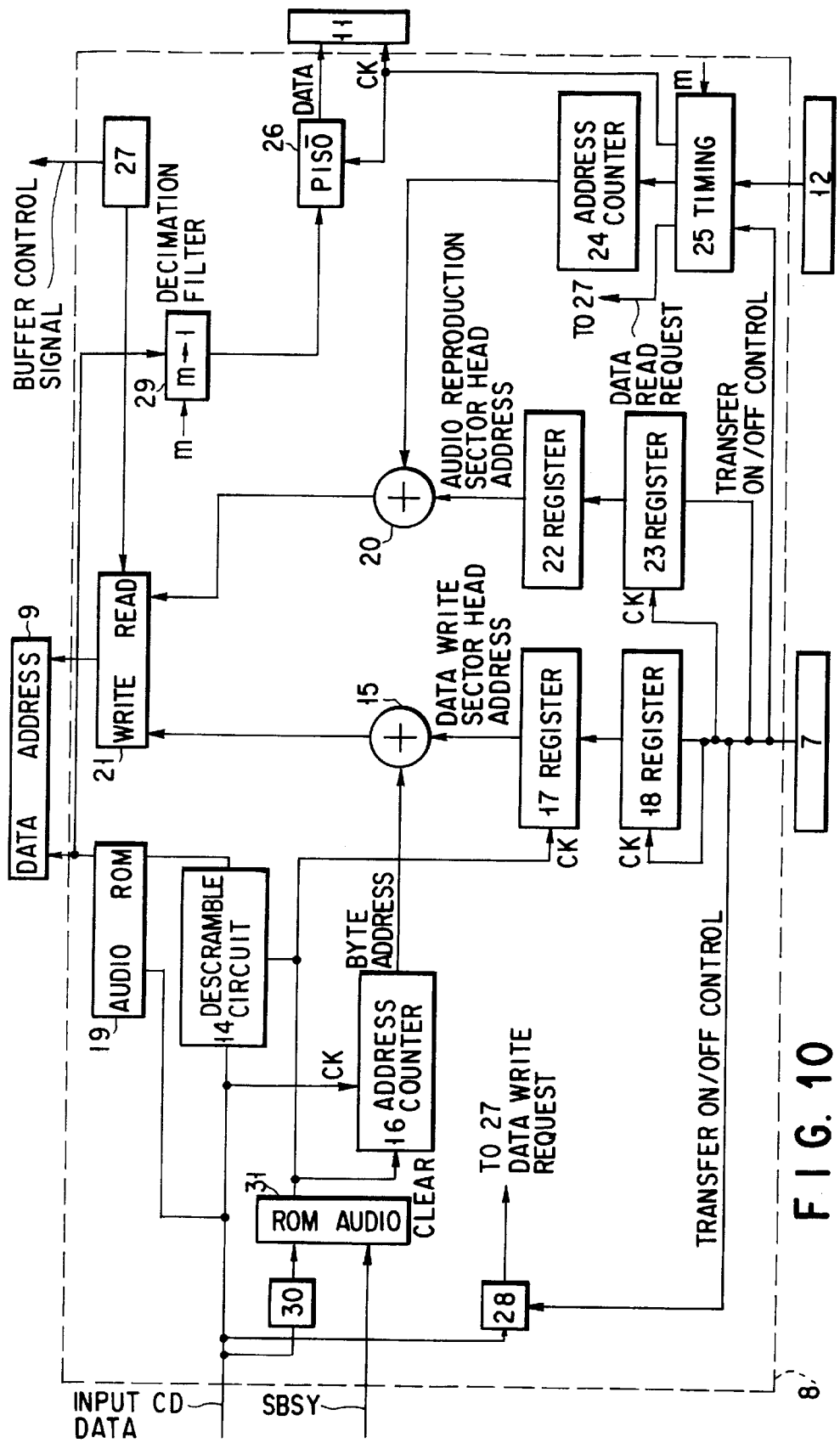
F I G. 10

OPTICAL DISK PLAYER CAPABLE OF PLAYING BACK BOTH CD-ROM AND CD-DA

BACKGROUND OF THE INVENTION

The present invention relates to a disk reproduction apparatus and, more specifically, to a disk player applicable to different recording/reproduction rates used for audio data, ROM data, etc.

In the field of acoustic equipment, a digital recording/reproduction system for converting an audio signal into a digital signal by PCM (pulse code modulation), recording the digital signal on a recording medium such as a disk and a magnetic tape, and reproducing it therefrom in order to record/reproduce data with high density and high reliability, has recently been known. In particular, a 12-cm-diameter CD (compact disk) for optically reading a bit string corresponding to digitized data is the most wide-spread. In such a compact disk, an optical pickup element including a semiconductor laser and a photoelectric conversion element is moved linearly from the internal circumference of the disk toward the outer circumference thereof, and the disk is rotated at CLV (constant linear velocity), thereby to read data out of the disk. The compact disk stores 16-bit digital data (main information) into which an analog audio signal is converted by PCM. This digital data is stored by repeating one frame constituted of 24 symbols each corresponding to 8 bits.

Data of 32 symbols constituted of digital data of 24 symbols, parity data P of 4 symbols, and parity data Q of 4 symbols, is supplied with 8-bit (one-symbol) sub-code data through a one-frame delay circuit. The 32-symbol data and sub-code data are modulated by EFM (eight to fourteen modulation). A 3-bit margin is formed between the modulated 14-bit symbols, and a 24-bit frame periodic signal is added to the head of the 32 symbols. Thus, 588-bit data is recorded on the disk as one frame and, in this case, since a bit clock is 4.3218 MHz, the data is recorded on the disk at 136 $\mu$ sec (7.35 KHz) per frame. The sub-code data, which is constituted of sub-code frames each corresponding to 98 frames, is recorded on the disk at 75 Hz (13.3 msec) per sub-code frame.

In the disk reproduction apparatus, digitized data, which is read out from the disk and from which a synchronous signal is separated, is demodulated by EFM and divided into a 32-symbol word component and a sub-code data component.

In a signal processing circuit, the EFM-demodulated data is written to a memory by a reproduction frame clock of a PLL (phase locked loop) circuit and read out from the memory by reference clock of the apparatus, thus absorbing variations in time base due to a disk motor. To change the reproduction velocity of data read out from the disk, a two-fold velocity control signal supplied to a clock circuit for supplying a frame clock for controlling the signal processing circuit, is employed.

Searching for target reproduction data based on time information of sub-code Q data, the same reproduction data can be obtained since the sub-code data and reproduction data have the specific phase relationship on the disk.

A CD-ROM drive as well as a CD is well-known as a typical disk reproduction apparatus. The CD-ROM is a device for reproducing both an audio signal and ROM data such as image information and character codes which exist independently or being mixed in the disk. The audio signal is reproduced at normal reproduction velocity in order to output it as sound, and this velocity is defined as a one-fold velocity. In contrast, the ROM data is reproduced at high velocity, e.g., at an n-fold velocity (n=2 or more) to be read out as quick as possible. In order to reproduce data from such a disk, the reproduction velocity has to be changed frequently, e.g., from one-fold velocity to twofold velocity, and vice versa.

Consequently, if the reproduction of data is intermitted because of a change in velocity, the player is greatly decreased in performance. A high-performance disk motor can be used to improve performance, which greatly increases in costs.

A prior art CD-ROM system (CD-ROM drive) having a CD player will now be described with reference to FIG. 1. In this system, a quartz clock is used for a signal processing reference clock. For buffer RAM access for error correction, a quartz frame clock supplied from a reference clock generation circuit 12 having a quartz oscillator is used for a readout frame clock, and a PLL clock generated by a PLL circuit of a CD signal processing circuit 6 is used for a write frame clock.

A disk 1 is irradiated with a laser beam emitted from a pickup (PU) 3, and its reflected light is received to read information data out of the disk 1. The readout data is supplied to an RF circuit 4 to issue an RF signal having an equalized waveform. The RF signal is converted to binary digital data and called an EFM (eight to fourteen modulation) signal. The EFM signal is input to the PLL circuit, and a sync clock signal CK is extracted from the EFM signal. In the PLL circuit, data signal DATA is generated.

In the signal processing circuit 6, the data signal and clock signal are supplied to a correction circuit through a synchronous separation circuit, and their errors are corrected using a correcting memory (RAM). The corrected data are read out by a quartz type reference clock generated from the reference clock generation circuit 12 based on the clock oscillated by the external quartz oscillator. The correction circuit outputs data signal DATA and sync clock signal CK.

The data signal includes audio data and CD-ROM data. In the audio mode, an audio signal corrected by the correction circuit, is converted to an audio analog signal by a DAC (digital to analog converter) 11. The DAC 11 outputs an audio signal reproduced through a low-pass filter (not shown). In the CD-ROM mode, a data signal is processed by neither the DAC 11 nor LPF, but supplied to a CD-ROM decoder circuit 8 and output as a digital signal. A signal corrected by the correction circuit, is sent from the signal processing circuit 6 to the CD-ROM decoder circuit 8 and transferred to a host computer 10 while executing correction (layered ECC) of a CD-ROM and buffering. In the audio mode, the audio signal is processed by a CD player and thus reproduced at one-fold CLV, whereas in the normal CD-ROM mode, the signal is reproduced at n-fold CLV or CAV.

A servo type signal read out from the pickup 3, is supplied to a servo circuit 5 via the RF circuit 4 and equalized thereby to drive an actuator and a pickup feeding motor of the pickup 3.

The signal processing circuit 6 generates a signal for rotating the disk, and the signal drives a disk motor 2. A system controller 7 controls the servo circuit 5 for controlling various CD servo systems through a microcomputer (I/F).

Since a CD system is originally an audio reproduction system, a CD is rotated at one-fold velocity, but its transfer rate is lower than that of a generally-used computer storage media; therefore, it is an important objective to increase in transfer rate. There has recently been an 24-fold velocity disk reproduction apparatus, and there are no bounds to competition for velocities, such as an increase from twofold velocity to fourfold velocity, eight-fold velocity and twenty four-fold velocity.

In a disk reproduction apparatus, especially a CD-ROM drive having a CD player and a CD-ROM decoder circuit, the reproduction rate of the CD player fixed for audio data is one-fold CLV, whereas in the CD-ROM drive, data is accessed at one or both of higher-velocity n-fold (n>1) CLV and CAV (constant angular velocity), regardless of the reproduction rate fixed for audio data, thus improving in data transfer velocity and search velocity. For audio reproduction, data need to be continuously supplied to a DAC at constant velocity. Since, however, the CD player generally has only a small-sized buffer memory for correcting an error, it was necessary to apply the CD player to the one-fold CLV.

If the velocity of high-velocity reproduction in the CD-ROM mode becomes higher than that of the one-fold velocity reproduction in the audio mode, the circuit constant of the former reproduction is difficult to conform with that of the latter one, because of a servo band, and parallel circuits have to be switched or high-performance (wide band) devices or elements should be adopted, thus increasing in costs.

BRIEF SUMMARY OF THE INVENTION

The present invention has been developed in consideration of the above situation, and its object is to provide a disk reproduction apparatus including both a CD player and a CD-ROM decoder circuit, which reproduces PCM data at a rate uncorrelated with an audio reproduction rate thereby to narrow a range necessary for operating the apparatus.

In order to attain the above object, there is provided a disk reproduction apparatus comprising a CD player for reading information data from a disk as reproduction data and control data and demodulating the reproduction and control data, a decoder for decoding the demodulated reproduction and control data, a buffer memory controlled by the decoder, a write means for writing the demodulated reproduction and control data to the buffer memory, and a readout means for reading the reproduction and control data out of the buffer memory.

The information data includes audio data and ROM data, and the read out means for reproduction and write means to the buffer memory read the information data at a high rate uncorrelated with an audio reproduction rate. The readout means reads the information data at the audio reproduction rate. The information data and control data are reproduced while maintaining a fixed relationship in phase therebetween. The control data is sub-code data. When unreproduced data remains in the buffer memory, the unreproduced data is searched again and rewritten to the buffer memory before reproduction of the unreproduced data of the buffer memory is completed.

When the reproduction data is transferred to the buffer memory and then next data is transferred thereto, the next data is searched and written before transfer of the reproduction data is completed. The reproduction data is constituted of a plurality of sectors, and these sectors are read out in order different from the order of write to read out the reproduction data. The reproduction data is constituted of a plurality of sectors, and when the reproduction data are read out, audio data and ROM data are reproduced separately from each other at different times.

Since the buffer memory controlled by CD-ROM decoder circuit has a relatively large capacity, a write/read operation for the audio data can be performed easily and sufficiently.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a characteristic diagram showing variations in data amount of a buffer as time elapses when a disturbance occurs;

FIG. 6 is a characteristic diagram showing variations in data when a track jump occurs;

FIG. 10 is a circuit diagram of the CD-ROM decoder of the present invention to which a decimation filter is added;

DETAILED DESCRIPTION OF THE INVENTION

Embodiments of the present invention will now be described with reference to the accompanying drawings.

Figure 1:
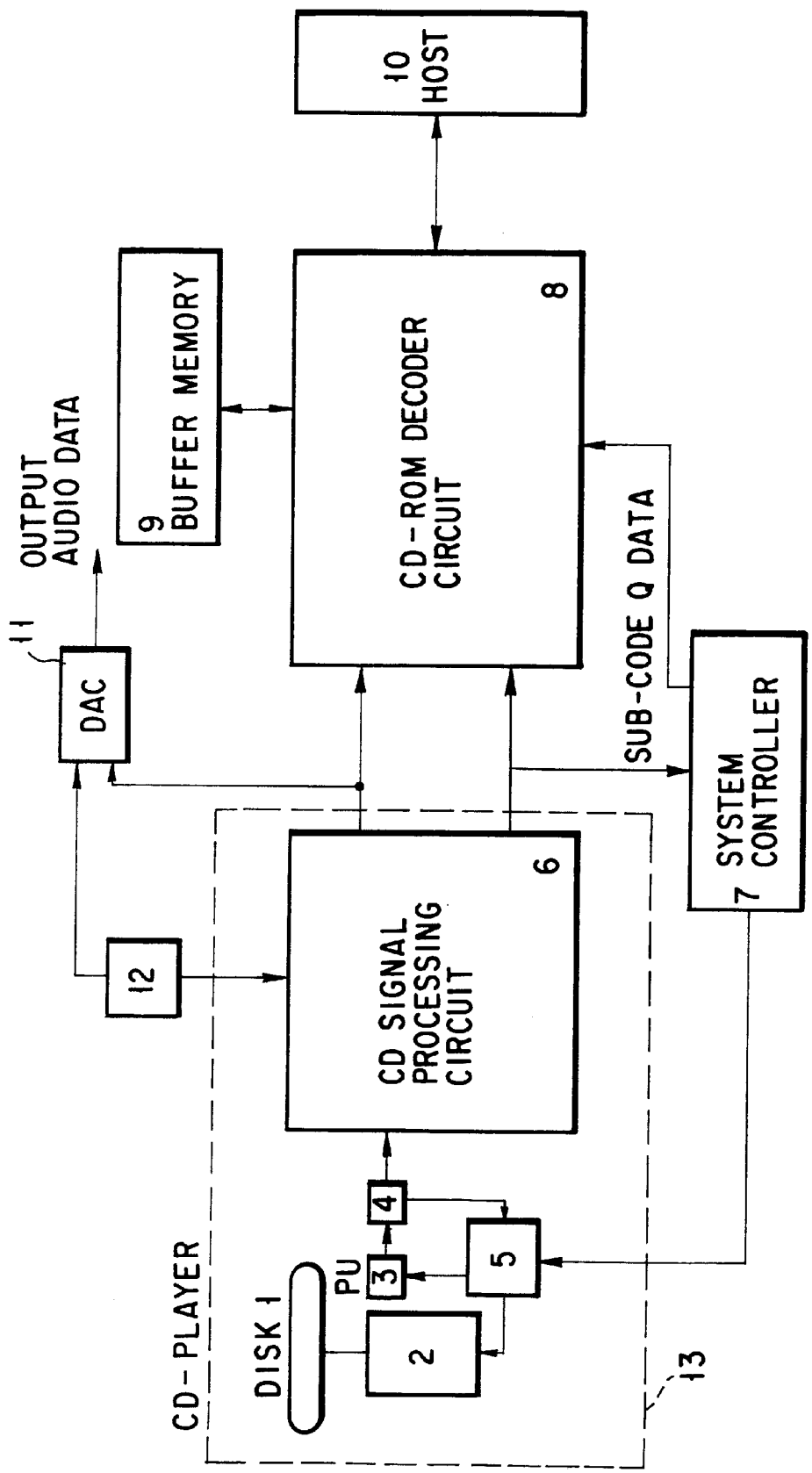
FIG. 1 is a circuit block diagram of a prior art CD-ROM drive.
Figure 2:
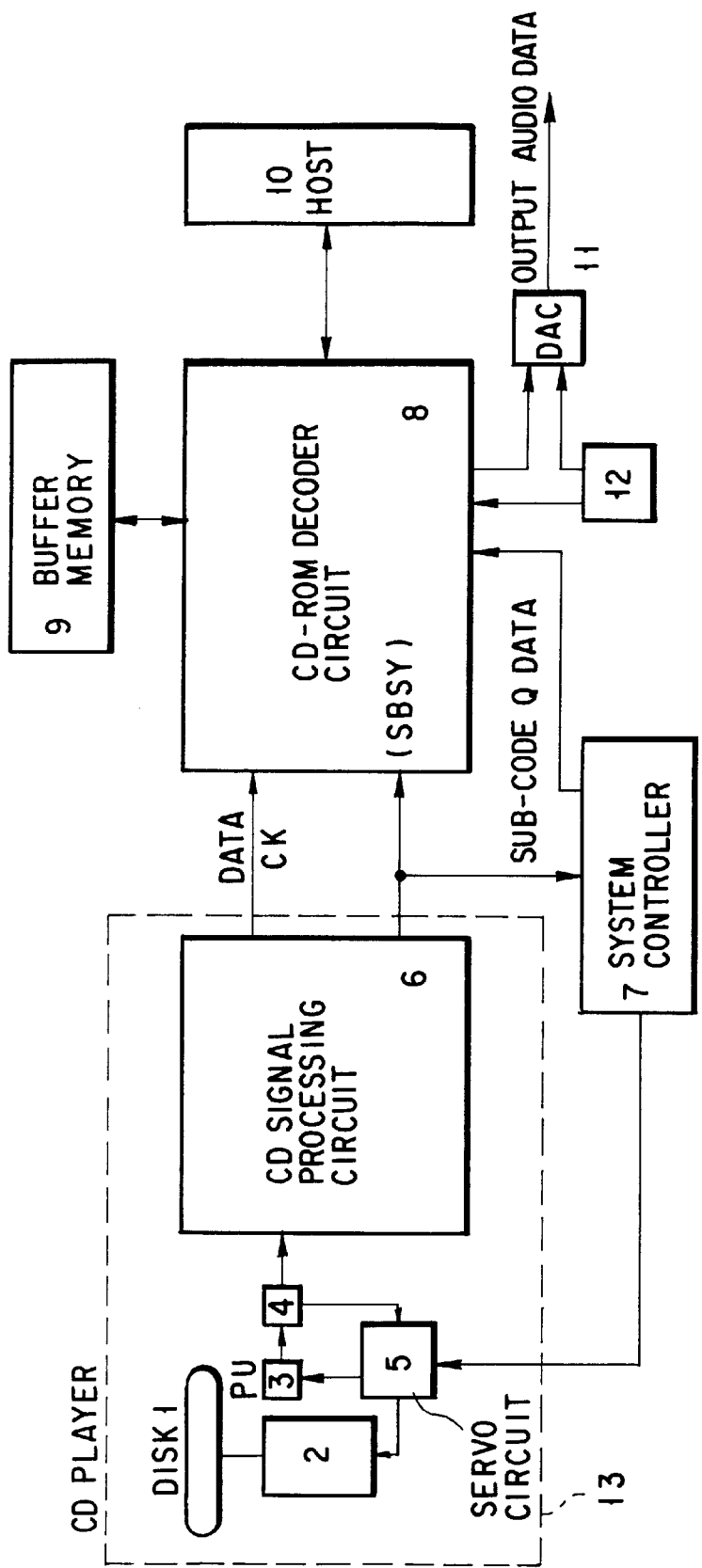
FIG. 2 is a circuit block diagram of a CD-ROM drive of the present invention.
Figure 3:
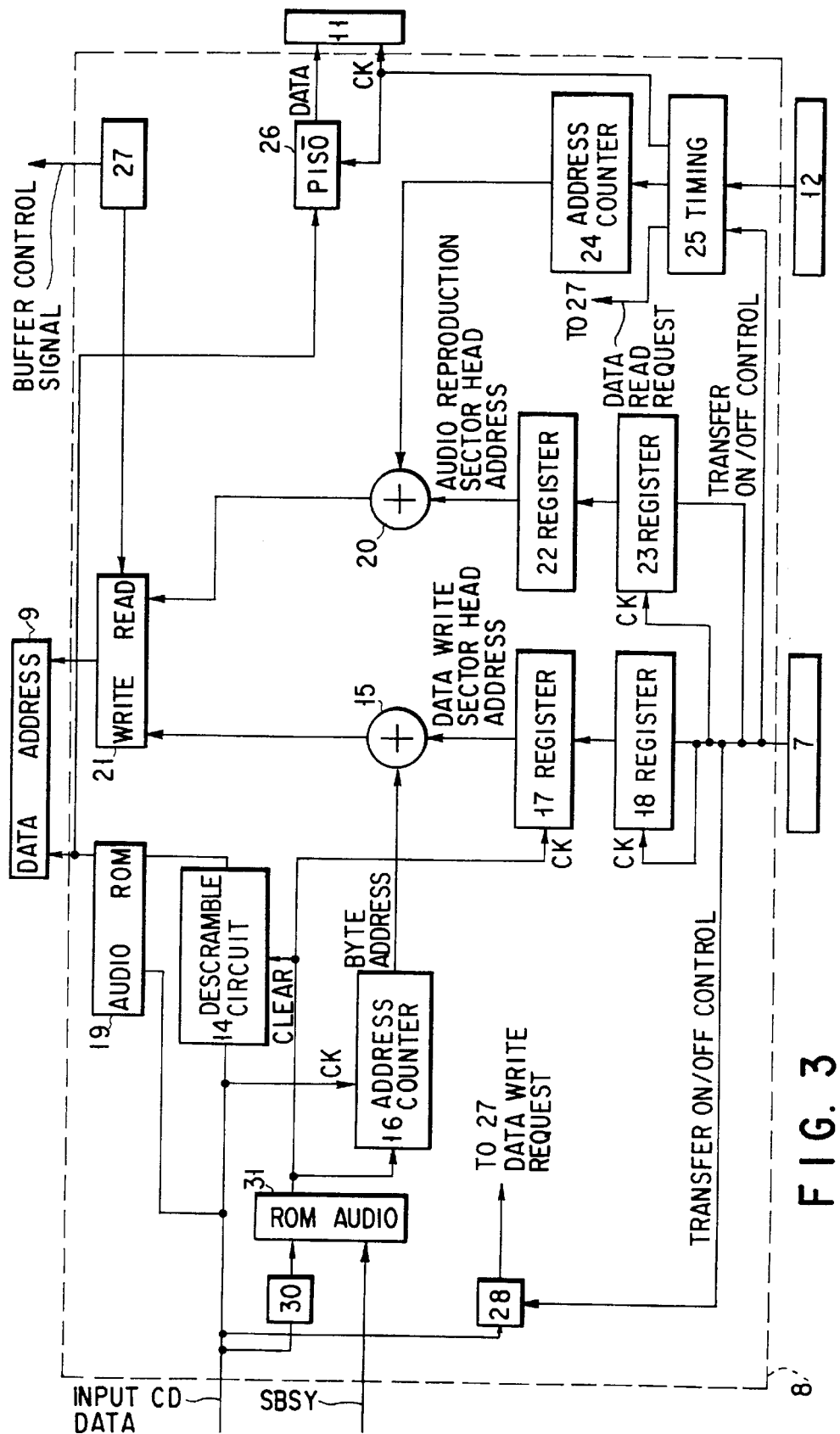
FIG. 3 is a circuit block diagram of a CD-ROM decoder of the present invention.
Figure 4:
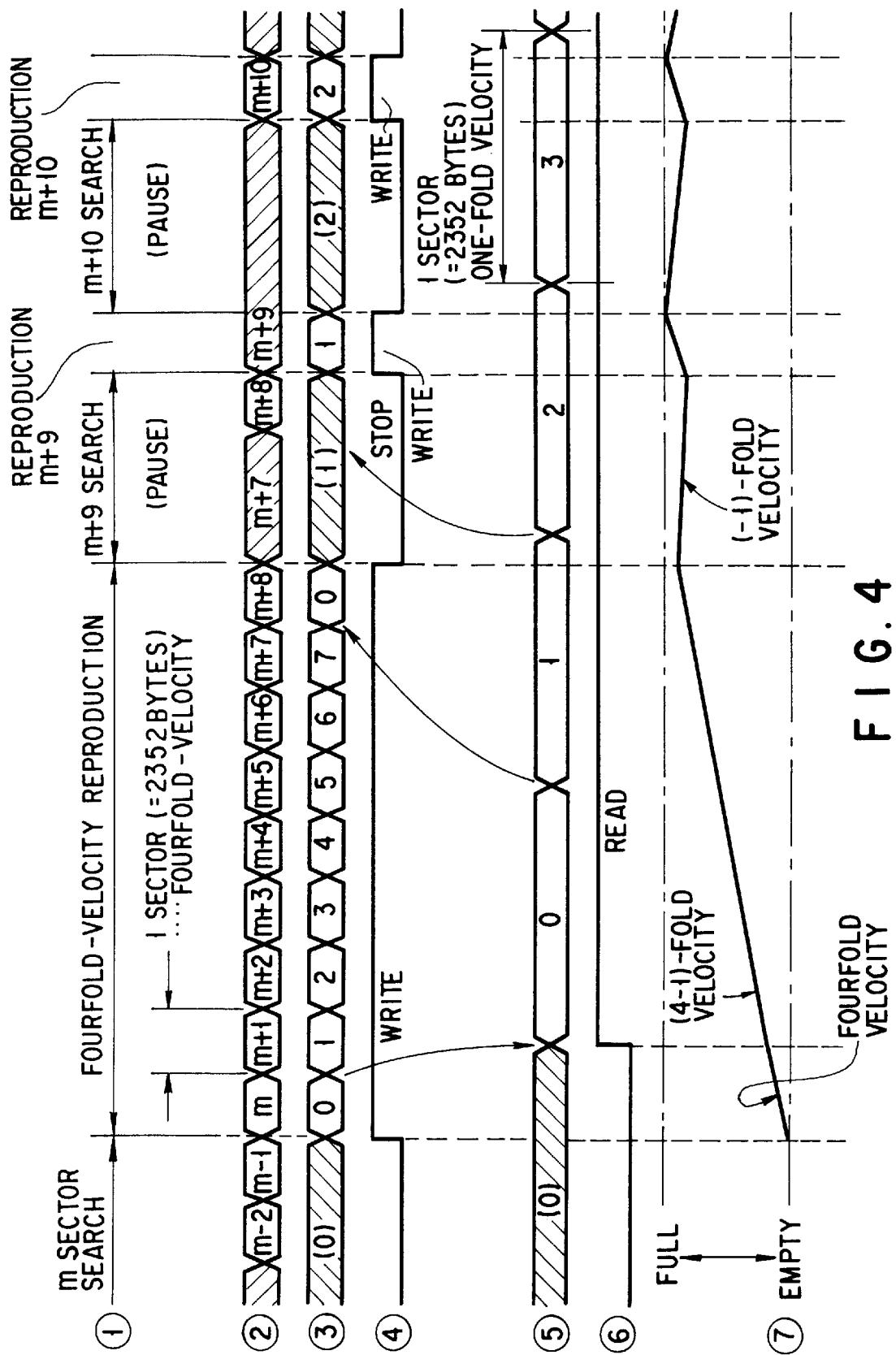
FIG. 4 is an operation timing chart of the CD-ROM drive of the present invention.

Referring first to FIGS. 2, 3 and 4, a CD-ROM drive including a CD player and a CD-ROM decoder circuit according to a first embodiment of the present invention will be described. FIG. 2 is a circuit block diagram of the CD-ROM drive, FIG. 3 is a block diagram of a CD-ROM decoder circuit, and FIG. 4 is an operation timing chart of the CD-ROM drive. In this CD-ROM drive, a quartz type clock is used as a reference clock of signal processing, a quartz type frame clock supplied from a reference clock generation circuit 12 having a quartz oscillator is employed as a readout frame clock, and a PLL type clock generated from a PLL circuit included in a CD signal processing circuit 6 serves as a write frame clock.

A disk 1 is irradiated with a laser beam emitted from a pickup (PU) 3, and its reflected light is received to read information data out of the disk 1.

The readout data is supplied to an RF circuit 4 to issue an RF signal having an equalized waveform. The RF signal is converted to binary digital data (EFM signal). The EFM signal is input to the PLL circuit, and a sync clock signal CK is extracted from the EFM signal. In the PLL circuit, data signal DATA is generated.

In the signal processing circuit 6, the data signal and clock signal are supplied to a correction circuit through a sync separation circuit, and their errors are corrected using a correcting memory (RAM) which is built-in or externally attached to the signal processing circuit 6. The correction circuit outputs data signal DATA and sync clock signal CK.

The error-corrected data is supplied to a CD-ROM decoder circuit 8, written to a buffer memory 9, then controlled by the circuit 8, in response to a sync clock signal, and read out by the quartz type reference clock generated from a reference clock generation circuit 12 based on the clock oscillated from an external quartz oscillator in audio mode.

The data signal includes audio data and CD-ROM data. In the audio mode, an audio signal is converted to an audio analog signal by a DAC 11 which is controlled by the CD-ROM decoder circuit 8. The DAC 11 outputs an audio signal reproduced through a low-pass filter (not shown). In the CD-ROM mode, a data signal is processed by neither the DAC 11 nor LPF, but output from the CD-ROM decoder circuit 8 as a digital signal. The digital signal is transferred to a host computer 10.

As in the prior art CD-ROM system, a servo type signal read out from the pickup 3, is supplied to a servo circuit 5 via the RF circuit 4 and then undergoes equalizing and drives an actuator and a pickup driving-motor of the pickup 3. The signal processing circuit 6 generates a signal for rotating the disk, and the signal drives a disk motor 2. A system controller 7 controls the servo circuit 5 for controlling various CD servo systems through a microcomputer (I/F).

A sector detecting function of the CD-ROM decoder circuit, is not carried out to detect normal synchronization of data in the audio reproduction mode but controlled by a signal synchronized with a sector of a sub-code. As one example of this signal, there is a sub-code block sync signal SBSY defined in EIAJ CP-309. The DAC 11 is not directly connected to the CD player but supplied with data read out from the buffer memory 9 at a rate of 44.1 kHz×4 bytes which is an audio reproduction rate of the CD player. Unlike in the audio reproduction of the prior art system, the CD player including the disk, servo circuit and signal processing circuit, is featured in operating under the same condition without distinction between the CD-ROM mode and audio reproduction mode.

Consequently, the servo/PLL system circuit of the CD player has only to be designed so as to be applicable only to the high-velocity mode. The CD player of the present invention is simpler than that of the prior art system which operates in at least two modes of one-fold CLV and high-velocity (n-fold velocity) modes (n>1).

The principle and operation timing of the CD-ROM drive according to the present invention will now be described with reference to FIG. 4. In the first embodiment, a 2-Mbit RAM is employed as a buffer memory connected to and controlled by the CD-ROM decoder circuit.

The (ring) buffer memory has a capacity corresponding to a maximum of 111 sectors ($2^{21}$ bits/8 [bits/byte]/2352 [bytes/sector]>111 sectors) when it deals with data only. The 111 sectors correspond to data of audio reproduction time of about one and a half seconds {111 sectors/75 [sectors/second]=1.48 seconds}. Since, in actuality, a sub-code, a correction flag, and a work area are assigned to the buffer memory, all data are not used for transfer.

To simplify the description, a system having an 8-sector ring buffer memory (referred to as a buffer hereinafter) and a CD player for reproducing data at fourfold velocity and doing audio data at one-fold velocity, will be described as an example. FIG. 4 illustrates an example of reproduction from sector number $\underline{m}$. In FIG. 4, ① indicates an operation of the CD player, and ② denotes a fourfold-velocity reproduction sector. One sector (=2352 bytes) is reproduced at fourfold velocity. ③ shows a buffer write address; ④, an on/off signal of write; ⑤, a buffer read address; ⑥, an on/off signal of read; and ⑦, the remaining amount of data of the buffer.

The system controller controls the motor and pickup to execute reproduction of sector $\underline{m}$ in a fourfold-velocity mode. The sector $\underline{m}$ is detected using reproduced sub-code Q data. First a sector m−1 precedent to the sector $\underline{m}$ is detected, and then the transfer of data from the CD-ROM decoder circuit to the buffer is started. The actual data write to the buffer (buffer write) starts to be executed in synchronization with the next sector head SBSY. This synchronization processing accurately finds the sector head in byte unit. The address of the buffer is calculated as follows: sector number (0 to 7)*sector length (e.g., 2352 bytes)+address within sector (0 to 2351)=sector head address+address within sector.

The address within sector is incremented every buffer write, while the sector number is updated in units of sector (it is generally incremented as a ring buffer). If a data bus of the buffer is expressed by nibble and word, 2352 bytes correspond to 4704 nibbles and 1176 words. The sector length can arbitrarily be determined unless there is an overlap of data between sectors on a memory map and, in this case, the addresses output to the DAC are not continued over adjacent sectors.

In the data write to the buffer, it is necessary to update a start address and return address within sector 2351 to 0 before the first data is written after each sector head SBSY. In the first embodiment, an octal sector counter for incrementing the addresses by the SBSY input from the CD player and a 2352 based address counter 16 for clearing the addresses by the SBSY and automatically incrementing them in data writing, are employed (see FIG. 3).

In FIG. 3, reference numeral 14 indicates a descramble circuit; 15 and 20, adders; 16 and 24, 2352 based address counters; 17, 18, 22 and 23, registers; 19, 21 and 31, data selectors; 25, a timing circuit for DAC interface timing; 26, a parallel-serial converter for converting data into a DAC format; 27, a timing circuit/buffer control circuit for controlling the buffer; 28, a timing circuit for requesting write of CD data; and 30, a sync detector.

Audio data can always be reproduced unless data underruns on the buffer. In this embodiment, audio data starts to be reproduced after data for one sector is completely written to the buffer. The correlation of the CD player with the sync signal SBSY is not required unless the data write is completed in synchronization with the SBSY. The audio reproduction is started when the buffer has more than one sector data, while the write of data is stopped in 8 sectors and restarted below 7 sectors.

A second embodiment of the present invention will now be described with reference to FIG. 5. FIG. 5 is a characteristic diagram illustrating variations in data amount of a buffer as time elapses when a disturbance occurs.

The second embodiment provides a method of restoring data damaged by a shock or the like during reproduction. In a car-mounted or portable disk reproduction apparatus, when a servo is undone due to a random disturbance such as vibration, an error cannot be sometimes corrected even by a CD format. According to the CD-ROM drive of the present invention, there are many cases where unreproduced data remains on the buffer since the CD player reproduction rate is higher than the audio reproduction rate. Therefore, before the reproduction of the unreproduced data is completed, a sector including a damaged block is read out again and, if the data write to the buffer is in time, neither a strange sound is produced nor muting occurs in view of hearing. Furthermore, even when the reread is delayed and the unreproduced data is lost due to a long disturbance generation time, the strange sound/muting generation time becomes shorter by the reproduction time of data of the buffer. As shown in FIG. 5, when no data can be written to a sector m due to a servo disturbance, the sector m is searched again and the data is written to the sectors m and m+1 before the data is interrupted. The second embodiment can be executed by the use of a large-capacity buffer controlled by the CD-ROM decoder circuit. The interruption of sound can thus be prevented.

A third embodiment of the present invention will be described with reference to FIG. 6. FIG. 6 is a characteristic diagram illustrating variations in data as time elapses when a track jump occurs.

In order to fulfill functions of program reproduction, introduction scanning, etc. in the audio mode, ordinary reproduction and its next data search by the track jump are executed alternately. Since there is no data to be reproduced during the time for executing the jump, the muting is required.

The muting period can be limited to a minimum using a pre-read function of the buffer. When data of the final sector T(N)(n) to be reproduced is transferred to the buffer, the CD player searches for a sector T(M)(0) of the next arbitrary address. If the search and write to the buffer can be executed before the data of the final sector is completely transferred, data of track n of sector T(N) and that of track M of the next sector T(M) are continuously reproduced, thus requiring no search time for reproduction.

Figure 7:
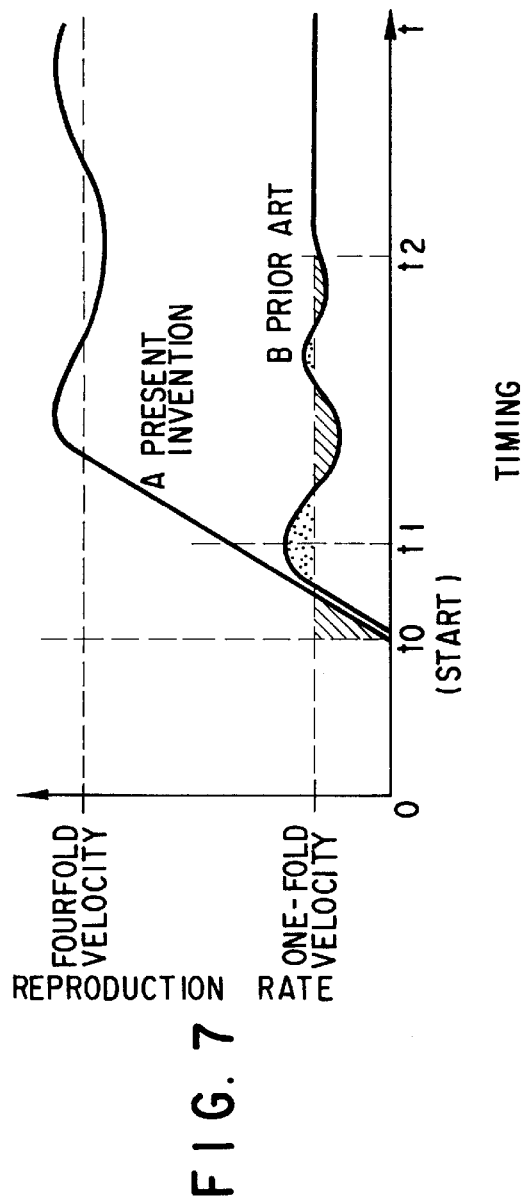
FIG. 7 is a characteristic diagram showing timing of detection of the beginning portion of data after the track jump.

A fourth embodiment of the present invention will be described with reference to FIG. 7. FIG. 7 is a characteristic diagram of timing of detection of the beginning of data after a track jump. If, in a CLV servo, the reproduction rate does not completely coincide with the audio reproduction rate, a buffer overrun/underrun occurs to cause a strange sound to occur. Therefore, in reproduction, even though sub-code Q data can be read after the track jump and correct data can be read, no audio data can be reproduced until a PLL circuit is pulled into one-fold velocity CLV.

In the present invention, however, data is read out at a rate which is considerably higher than the audio reproduction rate. Therefore, even though pull in to a target frequency of the PLL circuit is not completed, if it is achieved that a region in which PCM data such as an EFM signal is correctly reproduced by correcting an error, the write to the buffer can be started.

Furthermore, if the original transfer rate is higher than a one-fold velocity or unless the transfer rate of a one-fold velocity or lower for a long time, no underrun occurs even before pull in. It is thus possible to shorten time required from when a target sector is detected until a sound can be produced.

In FIG. 7, curve A indicates a transfer rate when a buffer of the present invention is employed, while curve B does a transfer rate when a prior art correcting memory is used.

According to this curve B, an underrun occurs in a region (hatched portion) lower than a one-fold velocity when data is beyond the capacity of the memory. And an overflow occurs in a region (dotted portion) higher than the one-fold velocity. On the other hand, the buffer of the present invention, which is controlled by the CD-ROM decoder circuit, has a larger capacity than that of the prior art correcting memory, and the target transfer rate is much higher than the one-fold velocity (fourfold velocity in this embodiment), with the result that timing capable of producing a sound is greatly quickened even though PLL pull in capability of the PLL circuit is low. According to the curve A, the transfer rate goes into a steady state at a fourfold velocity. In the present invention, when data can be read at higher than a one-fold reproduction velocity, it can be reproduced in a short time from t0 to t1. Conventionally, no data can be reproduced until pull in of the PLL circuit converges at the one-fold velocity (t=t2), so that reproduction time is greatly delayed.

Figure 8:
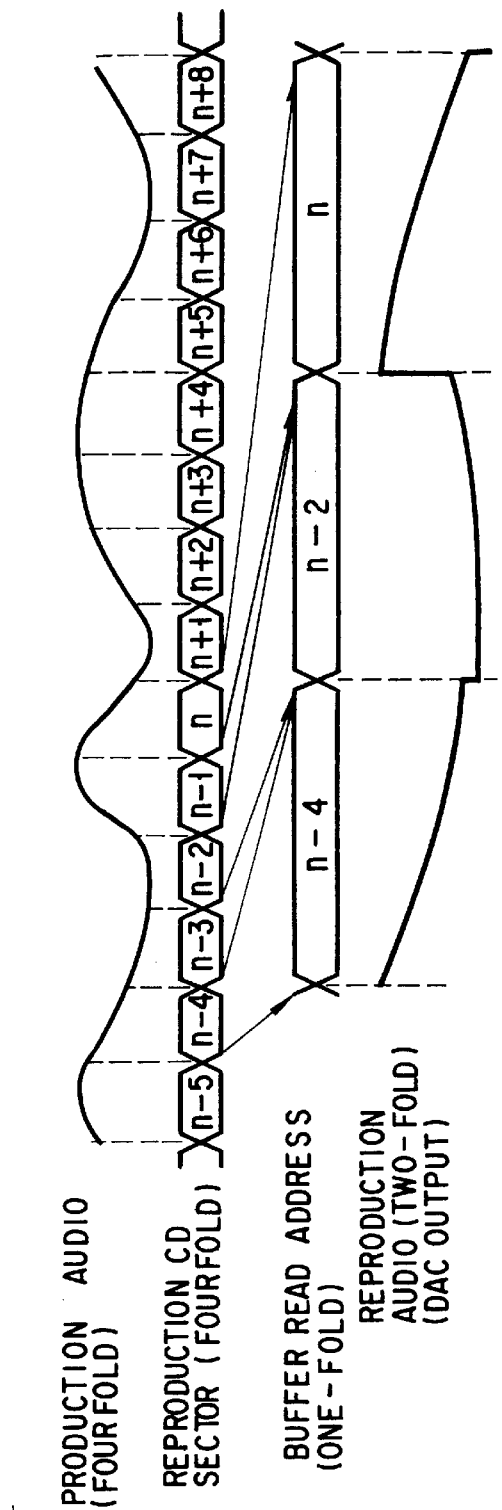
FIG. 8 is an operation timing chart of twofold-velocity audio reproduction.

A fifth embodiment of the present invention will now be described with reference to FIG. 8. FIG. 8 is a timing chart of twofold-velocity audio reproduction.

The fifth embodiment is directed to a simple, special reproduction method using a buffer. This method is featured by reading the buffer while jumping every other sector instead of reproducing every sector of the buffer. The jumping of sectors causes a phase jump among them and does not increase the grade of the audio reproduction, but a queue operation can be achieved (sectors n−3, n−1, . . . are jumped). If the buffer is read in an opposite direction, the number of sectors to be jumped is changed, or the same sector is read repeatedly, a review and a reproduction velocity other than the twofold velocity can be attained.

Figure 9:
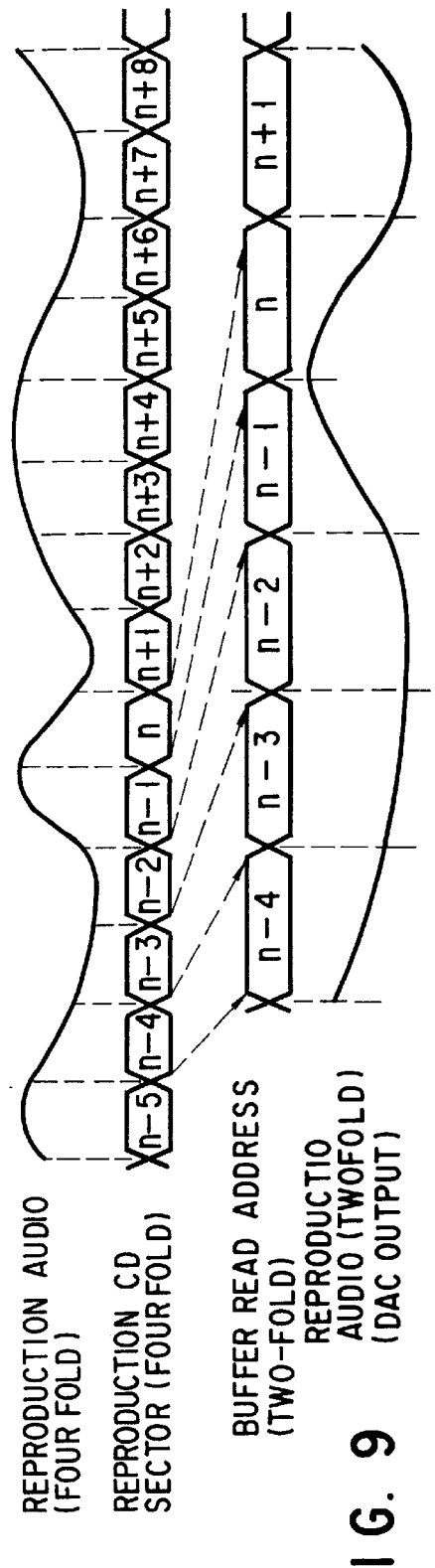
FIG. 9 is an operation timing chart of twofold-velocity audio reproduction which is increased in grade by adding a decimation filter to the twofold-velocity audio reproduction of FIG. 8.

A sixth embodiment of the present invention will now be described with reference to FIGS. 9 and 10. FIG. 9 is a timing chart of twofold-velocity audio reproduction which is increased in grade by adding a decimation filter to the embodiment of FIG. 8, and FIG. 10 is a block diagram of a CD-ROM decoder circuit to which the decimation filter is added. The sixth embodiment is directed to a case where data is read out of a buffer at different rates, input to an interpolation filter or a decimation filter, and reproduced therefrom. As in the case shown in FIG. 8, a disk servo does not rely upon the reproduction velocity but has only to operate at constant velocity; therefore, the circuit can be simplified, and the drawback of the prior art system in which no data can be read until the servo is stabilized due to a change in velocity, does not occur.

In FIG. 3, the audio data read out of the buffer is supplied to the DAC 11 through the parallel-serial converter (PISO) 26, and the decimation filter 29 is interposed between the buffer and converter 26. The reproduction velocity can be set appropriately.

Figure 11:
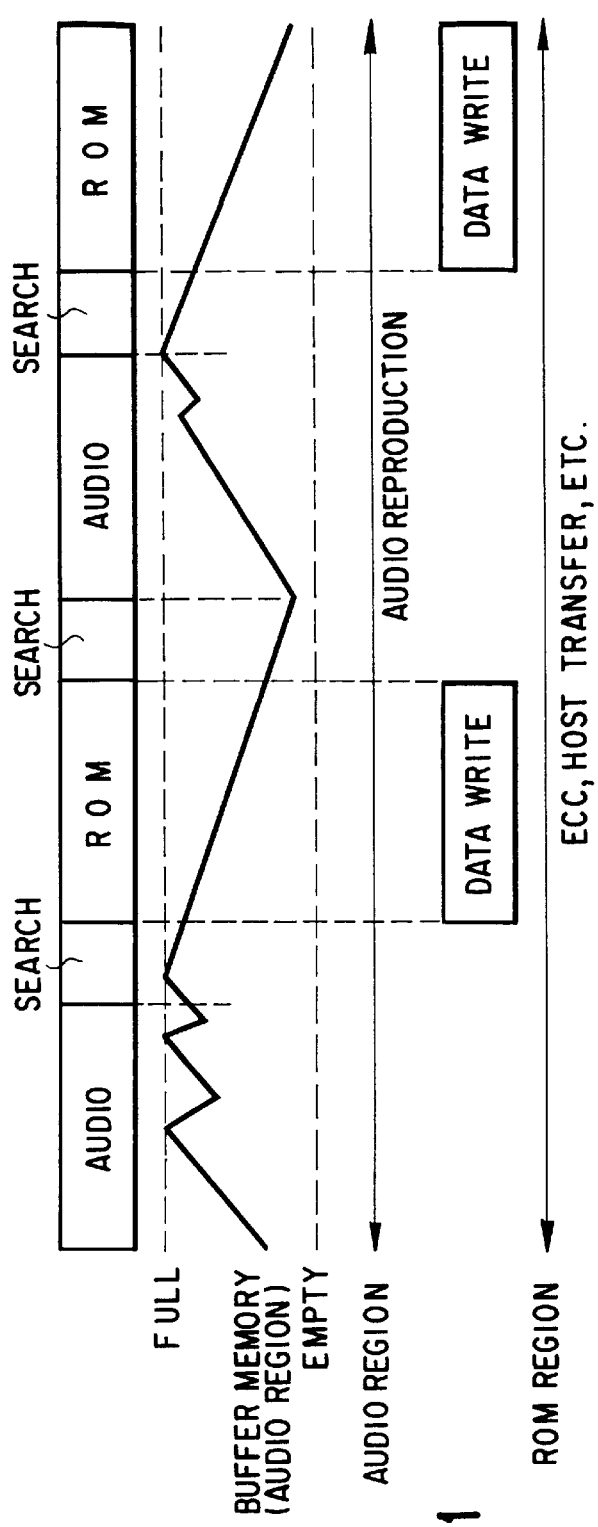
FIG. 11 is an operation timing chart of a disk reproduction apparatus of the present invention.
Figures 12A, 12B:
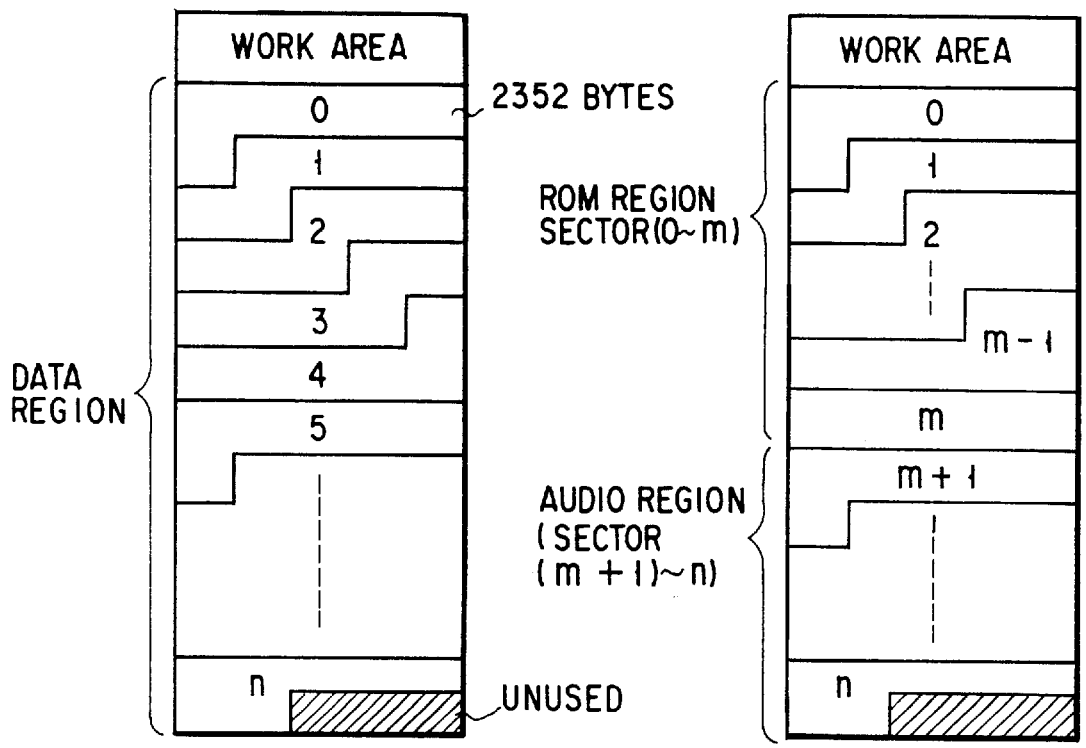
FIGS. 12A, 12B is a plan view of buffer memories of a prior art disk reproduction apparatus and the disk reproduction apparatus shown in FIG. 11.

A seventh embodiment of the present invention will now be described with reference to FIGS. 11, 12A and 12B. FIG. 11 is a timing chart showing an operation of a disk reproduction apparatus, and FIGS. 12A, 12B are plan views illustrating memory regions of buffer memorys controlled by a CD-ROM decoder circuit of the disk reproduction apparatus.

In the seventh embodiment, audio data and ROM data are recorded in their respective regions of the buffer memory. The conventional buffer memory includes a data region having sectors 0 to n and an unused region, as shown in FIG. 12A, whereas in the seventh embodiment the buffer memory includes a ROM region having sectors 0 to m and an audio region having sectors (m+1) to n, as illustrated in FIG. 12B. Since, in this embodiment, the audio reproduction and ROM reproduction are performed separately from each other at different times, the reproduction apparatus of the present invention operates as if it included two devices for the audio and ROM reproductions (FIG. 11).

Figure 13:
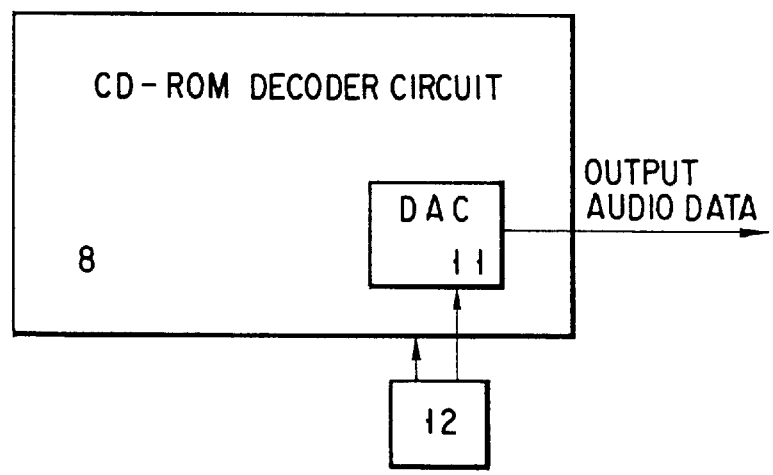
FIG. 13 is a block diagram of a CD-ROM decoder circuit of the disk reproduction apparatus of the present invention.

An eighth embodiment of the present invention will now be described with reference to FIG. 13. FIG. 13 is a block diagram of a CD-ROM decoder circuit. Unlike in the first embodiment, a DAC 11 is incorporated into the CD-ROM decoder circuit and, in this case, a parallel-serial converter (PISO) has only to be merely a latch circuit, thus improving in one-chip formation further.

It is needless to say that there is control data other than the sub-code data.

Figure 14:
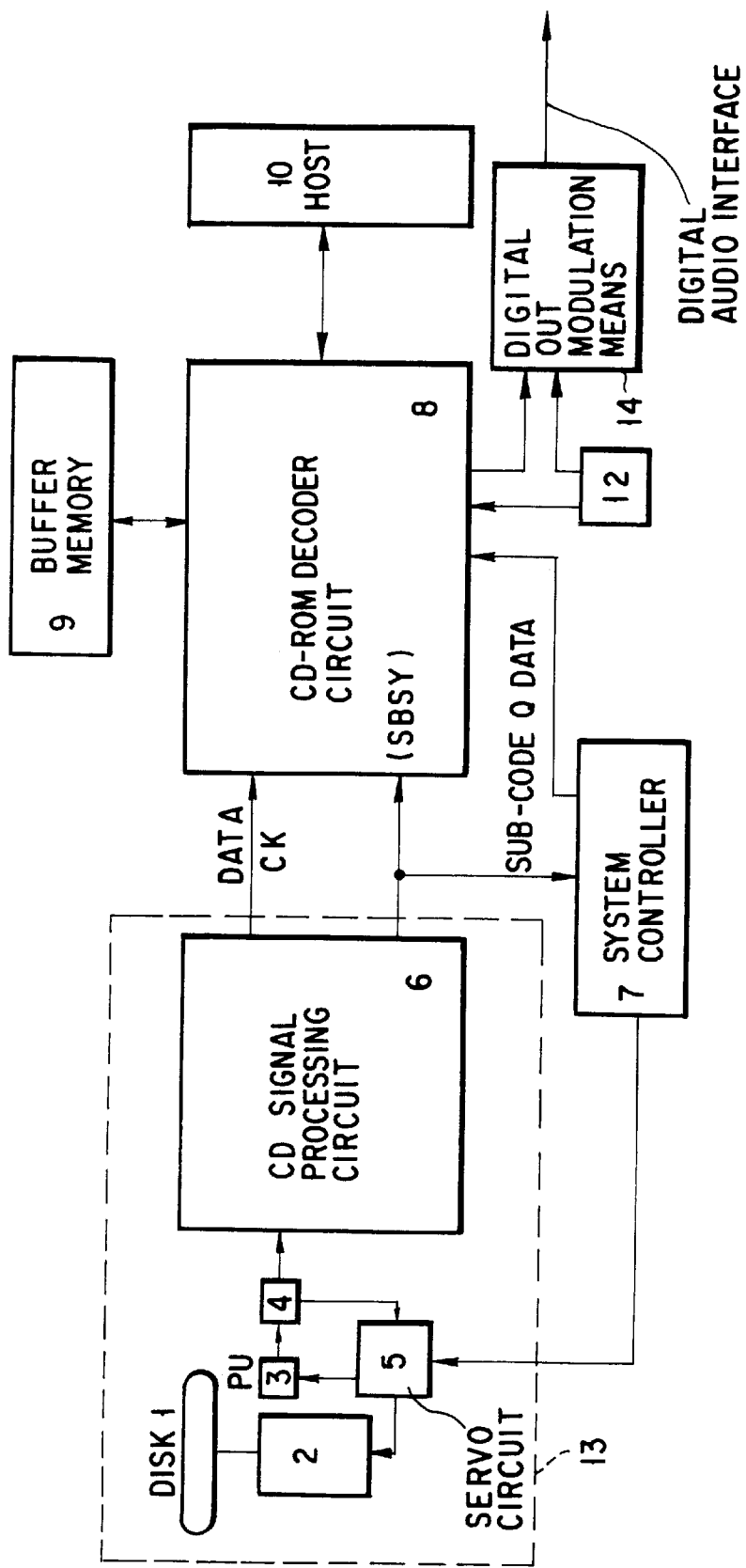
FIG. 14 is a circuit block diagram illustrating a first modification to the CD-ROM drive of the present invention.

A ninth embodiment of the present invention will be described with reference to FIG. 14.

According to the ninth embodiment, the DAC 11 of FIG. 2 is replaced with a digital OUT modulation means 14, and its output data is supplied to a digital audio interface (EIAJ CP-1201) as not audio data but digital data. In the ninth embodiment, data output to the digital audio interface is utilized in place of analog audio data, and the DAC 11 can be used together with the means 14.

Figure 15:
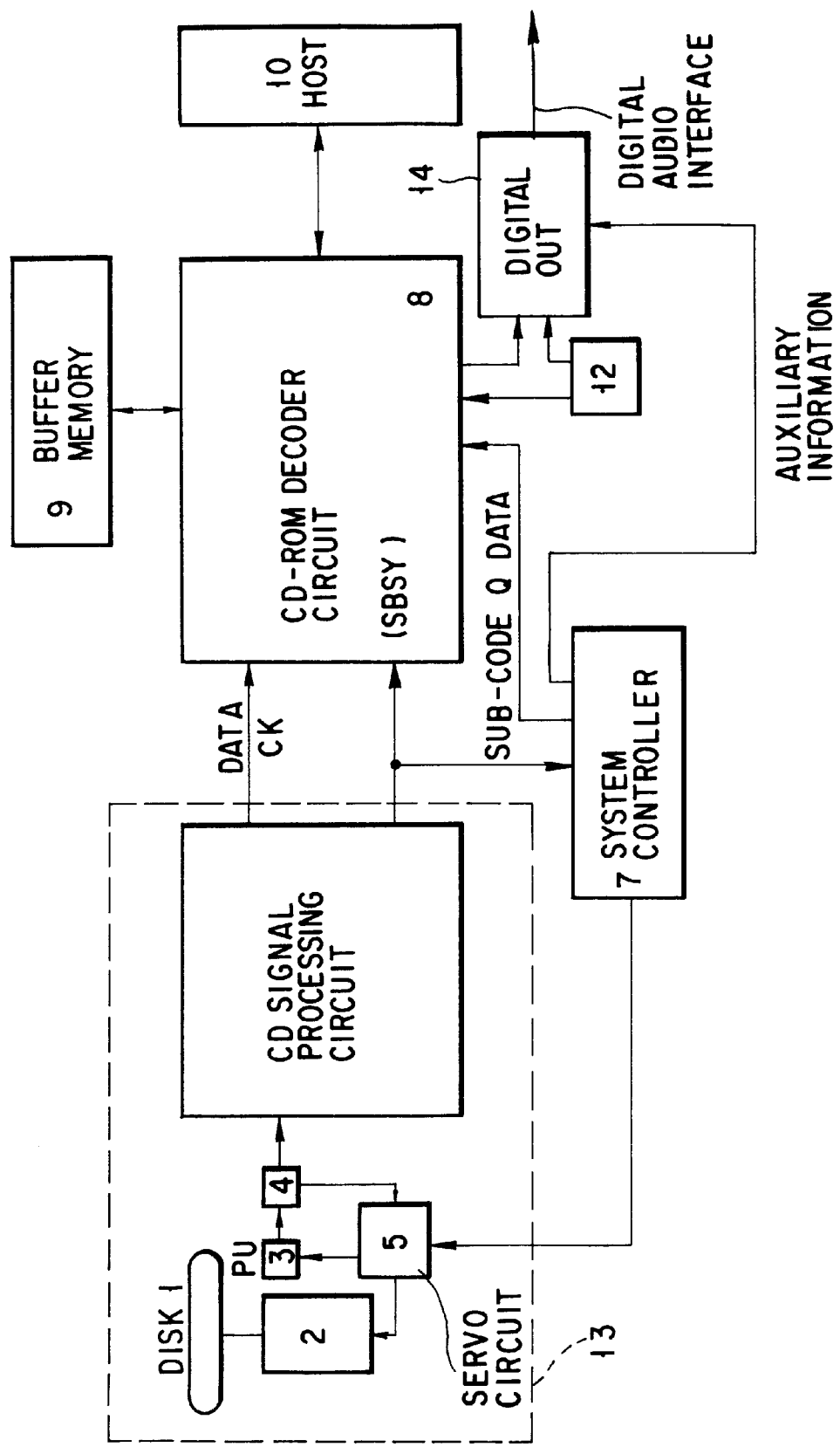
FIG. 15 is a circuit block diagram illustrating a second modification to the CD-ROM drive of the present invention.

A tenth embodiment of the present invention will be described with reference to FIG. 15.

The tenth embodiment differs from the ninth embodiment in that auxiliary information is supplied from the system controller 7 to the digital OUT 14. The auxiliary information is a parity bit, user data, a channel status, etc. The information reproduced from a CD is stored in advance, and its corresponding auxiliary information is searched when audio data is reproduced and added thereto.

Figure 16:
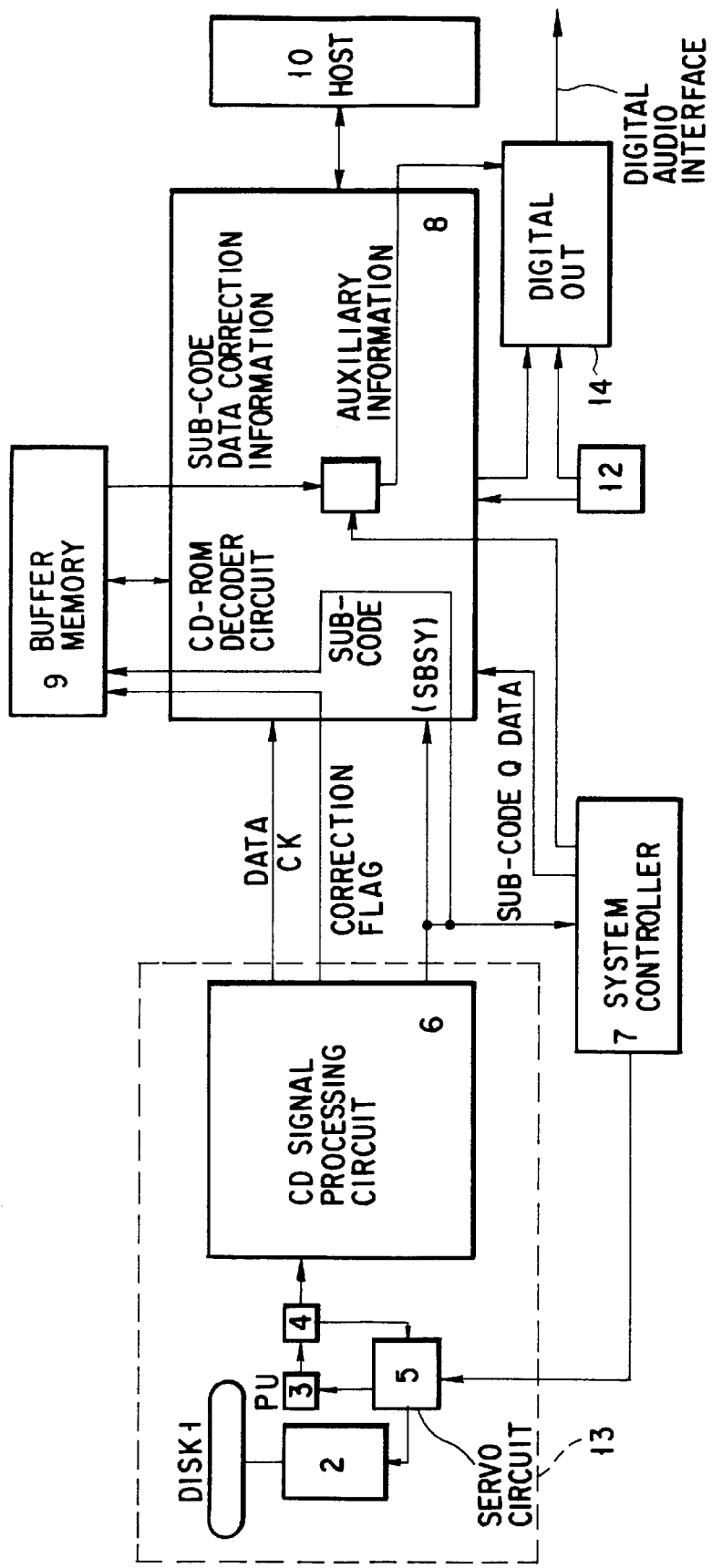
FIG. 16 is a circuit block diagram illustrating a third modification to the CD-ROM drive of the present invention.

An eleventh embodiment of the present invention will be described with reference to FIG. 16. In this embodiment, further auxiliary information is output to the digital OUT 14. In other words, correction information and sub-code are written to a buffer at the same time when PCM data is done. In reproduction, sub-code data corresponding to the PCM data is read out, and auxiliary information of the digital OUT 14 is added thereto.

The CD-ROM drive of the present invention is a system constituted of a plurality of chips formed on a plurality of silicon semiconductor substrates. For example, as shown in FIG. 2, the system includes CD signal processing circuit 6, system controller 7, CD-ROM decoder circuit 8, and buffer 9 such as a DRAM. It also includes a disk, a motor, a servo circuit and an RF circuit. The CD signal processing circuit 6, CD-ROM decoder circuit 8 and buffer 9 can be formed on one chip, the circuits 6 and 8 can be formed on one chip, and the circuit 8 and buffer 9 can be formed on one chip.

The present invention can be applied to an optomagnetic recording/reproduction system such as a computer, information equipment, a game system, and a DVD apparatus.

In the CD-ROM drive of the present invention, since audio data is written to/read out of the buffer having a large capacity controlled by a CD-ROM decoder, the CD-ROM mode servo has only to be used, with the result that an operation range required for the disk and servo circuit can be narrowed. If unreproduced data remains in the buffer memory, data can be read out again even though write-in of the data is intermitted. Since data can be transferred in advance to the buffer memory, reproduction of the data can be started early, and time for which sound cannot be reproduced can be shortened apparently. Furthermore, data can be read out even though the reproduction rate of the CD player does not converge at a target one. If an error is recovered, data can be transferred to the buffer memory, and the beginning portion of data in the audio reproduction after search is quickly detected. The audio reproduction velocity can be controlled independently of that of the CD player, so that a specific reproduction such as a queue and a review can be performed only by a logical operation of changing the order, direction and velocity at which data is read out from the buffer memory, which is not affected by mechanical components having large time constant.

Since, moreover, the audio reproduction and ROM reproduction are performed separately from each other at different times, the reproduction of a disk containing audio and ROM data is performed as if there were two devices for the audio and ROM reproductions.

As described above, since the write/read operation is performed for audio-mode data using a buffer memory having a relatively large capacity, controlled by the CD-ROM decoder circuit of the CD-ROM drive, the ROM-mode servo has only to be used. Consequently, a range required for operating the disk and servo circuit can be narrowed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

I claim:

1. A disk reproduction apparatus comprising:
    means for reading information data from a disk as reproduction data and sub-code data, and demodulating the reproduction data and the sub-code data;
    means for decoding the demodulated reproduction data and sub-code data;
    a buffer memory controlled by said decoding means;
    write means for writing increments of the demodulated reproduction data and sub-code data to said buffer memory while maintaining a fixed relationship in phase therebetween; and
    readout means for reading the demodulated reproduction data and the sub-code data out of said buffer memory while maintaining a fixed relationship in phase therebetween, wherein said information data includes audio data and ROM data, said reading and demodulating means reads the information data at a high rate uncorrelated with an audio reproduction rate, and said readout means reads the demodulated reproduction data at the audio reproduction rate.

2. The disk reproduction apparatus according to claim 1, wherein when unreproduced data remains in said buffer memory, next continuing data of the unreproduced data is searched and rewritten to said buffer memory after the unreproduced data before reading of the unreproduced data from said buffer memory is completed.

3. The disk reproduction apparatus according to claim 1, wherein when a first increment of said demodulated reproduction data is written to said buffer memory and then another increment of demodulated reproduction data is searched and written into said buffer memory before readout of said demodulated reproduction data is completed.

4. The disk reproduction apparatus according to claim 1, wherein said increments of said demodulated reproduction data written into said buffer memory comprises a plurality of sectors, and said plurality of sectors are readout in an order different from an order of write.

5. The disk reproduction apparatus according to claim 1, wherein said demodulated reproduction data comprises a plurality of sectors, and audio data and ROM data are read separately from each other from said buffer memory by said readout means at different times.

6. The disk reproduction apparatus according to claim 1, wherein said readout means includes a digital-to-analog converter and outputs an audio signal.

7. The disk reproduction apparatus according to claim 1, wherein said readout means includes digital output modulation means and outputs a digital audio signal.

8. The disk reproduction apparatus according to claim 7, wherein said digital output modulation means is supplied with auxiliary information from said decoding means.

* * * * *

UNITED STATES PATENT AND TRADEMARK OFFICE
CERTIFICATE OF CORRECTION

PATENT NO. : 6,055,216

DATED : April 25, 2000

INVENTOR(S): Fumihiko SHINTANI

It is certified that an error appears in the above-identified patent and that said Letters Patent is hereby corrected as shown below:

On the title page, item [73] is incorrect. It should read as follows:

--[73] Assignee: Kabushiki Kaisha Toshiba, Kawasaki, Japan--

Signed and Sealed this

Seventeenth Day of April, 2001

NICHOLAS P. GODICI

*Attest:*

*Attesting Officer*   Acting Director of the United States Patent and Trademark Office